US008864116B2

(12) United States Patent
Jung

(10) Patent No.: US 8,864,116 B2

(45) Date of Patent: Oct. 21, 2014

(54) VIBRATION INSULATOR

(71) Applicant: Hyundai Motor Company, Seoul (KR)

(72) Inventor: Hyunsoo Jung, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 74 days.

(21) Appl. No.: 13/650,890

(22) Filed: Oct. 12, 2012

(65) Prior Publication Data

US 2014/0001686 A1 Jan. 2, 2014

(30) Foreign Application Priority Data

Jun. 28, 2012 (KR) ........................ 10-2012-0070082

(51) Int. Cl.
*F16F 7/00* (2006.01)

(52) U.S. Cl.
USPC ........................................... 267/141; 267/293

(58) Field of Classification Search
CPC ................................ F16F 1/3732; F16F 15/08
USPC ................... 267/141, 159, 153, 293; 248/635
See application file for complete search history.

(56) References Cited

U.S. PATENT DOCUMENTS 2,951,674 A * 9/1960 Rice ........................... 267/141.4
3,319,918 A * 5/1967 Rapata .......................... 248/239
4,067,531 A * 1/1978 Sikula .......................... 220/378
4,530,491 A * 7/1985 Bucksbee et al. ............. 267/141
4,575,114 A * 3/1986 Camp .................... 280/124.152
5,431,260 A * 7/1995 Gross et al. .............. 188/321.11
6,247,686 B1 * 6/2001 Gabbin ......................... 267/147
6,719,482 B2 * 4/2004 Morita ....................... 403/408.1
7,246,797 B2 * 7/2007 Gustavsson ................ 267/141.4
2004/0168464 A1 * 9/2004 Seo et al. ........................ 62/295
2005/0206058 A1 * 9/2005 Masterson et al. ............ 267/293
2007/0095324 A1 5/2007 Takahashi et al.
2008/0217824 A1 * 9/2008 Schlitzkus et al. ......... 267/141.1
2010/0263321 A1 * 10/2010 Stevens et al. ............... 52/741.1

FOREIGN PATENT DOCUMENTS

JP 2006-131192 A 5/2006
JP 2007-303375 A 11/2007
KR 10-0335656 B1 5/2002
KR 10-0763965 B1 10/2007
KR 10-2007-0108672 A 11/2007
KR 10-2008-0032535 A 4/2008

* cited by examiner

*Primary Examiner* — Xuan Lan Nguyen

(74) *Attorney, Agent, or Firm* — Morgan, Lewis & Bockius LLP

(57) ABSTRACT

A vibration insulator apparatus may include a vibration insulating bush having a body having a head housing groove therethrough, a top surface contact portion extending from the body, a vibration distribution flange formed under the body and spaced from the top surface portion, and a vehicle frame contact portion formed under the vibration distribution flange and configured to contact with the vehicle frame, and a coupling bolt coupled to the vehicle frame and including a head housed in the head housing groove of the vibration insulating bush, wherein a flange of an air duct may be disposed between the top surface contact portion and the vibration distribution flange.

7 Claims, 10 Drawing Sheets

10
2a
30
35
1
3
20
2

VIBRATION INSULATOR

CROSS-REFERENCE(S) TO RELATED APPLICATIONS

The present application claims priority to Korean Patent Application No. 10-2012-0070082, filed on Jun. 28, 2012, the entire contents of which is incorporated herein for all purposes by this reference.

BACKGROUND OF THE INVENTION

1. Field of the Invention

Exemplary embodiments of the present invention relate to a vibration insulator which insulates vibration at a portion where an air duct of a vehicle and a vehicle frame are coupled to each other; and, particularly, to a vibration insulator which is easily assembled and reduces a contact area where vibration is transmitted, thereby insulating vibration transmitted in a vertical direction.

2. Description of Related Art

In order to fix an air duct to a vehicle frame, a coupling bolt is used to fix an end of the air duct to the vehicle frame, and an insulating member is interposed at a contact portion between the coupling bolt and the air duct. The air duct serves as a path for supplying air to an engine of the vehicle from the atmosphere.

For example, referring to FIG. 1, as the coupling bolt 120 is coupled to a coupling nut 3 fixed to the vehicle frame 1 through a flange 2*a* formed at an end of the air duct 2, the air duct 2 is coupled to the vehicle frame 1. Furthermore, in order to insulate vibration, a vibration insulating bush 130 serving as an insulating member is interposed between the coupling bolt 120 and the flange 2*a*.

However, when the air duct 2 is fixed to the vehicle frame 1 in the above-described described manner, a tool T as illustrated in FIG. 2 must be used to couple the coupling bolt 120, and vibration may not be sufficiently insulated in a vertical direction.

FIG. 3 is a cross-sectional view of a conventional vibration insulator. FIG. 4 is a cross-sectional view of the conventional vibration insulator when vibration is transmitted upward. When vibration is transmitted upward, the vibration insulating bush 130 and the top surface of the flange 2*a* come in surface contact with each other in a belt shape with a predetermined width, as indicated by 'A' of FIG. 4.

FIG. 5 is a cross-sectional view of the conventional vibration insulator when vibration is transmitted downward. Even at this time, the vibration insulating bush 130 and the bottom surface of the flange 2*a* come in surface contact with each other as indicated by 'B' of FIG. 5.

As described above, when vibration is transmitted in the vertical direction, the vibration insulating bush 130 comes in surface contact with the top/bottom surface of the flange 2*a*. Therefore, the contact area between the vibration insulating bush 130 and the flange 2*a* increases.

With the increase of the contact area, a reaction force to the transmitted vibration increases. Accordingly, since the vibration insulating bush 130 formed of an elastic material becomes more solid than in the initial state, the vibration insulating bush 130 may not normally absorb the transmitted vibration. As a result, the vibration insulating characteristic may be degraded.

Furthermore, when the air duct 2 is fixed to the vehicle frame 1, the coupling bolt 120 is coupled to the coupling nut 3 previously-fixed to the vehicle frame 1 by the tool T in a state where a collar 110 and the vibration insulating bush 130 are coupled to the flange 2*a*. In this case, since the coupling bolt 120 is coupled to the coupling nut 3 previously-installed in the vehicle frame 1 by the tool T after the flange 2*a*, the collar 110, the vibration insulating bush 130, and the coupling bolt 120 are assembled in a state where they are not fixed, the assembling is not easy to perform.

Furthermore, depending on an assembly tolerance, interference may occur between the vehicle frame 1 and the air duct 2. When the vibration insulating bush 130 is used to couple the air duct 2 and the vehicle frame 1, the assembling may be performed at the maximum tolerances allowed for the respective parts. In this case, since the centers of the through-hole of the flange 2*a*, the vibration insulating bush 130, the collar 110, and the coupling bolt 120 are not aligned with each other, the respective parts may be assembled toward one side.

When the centers of the through-hole 2*b* of the flange 2*a*, the vibration insulating bush 130, the collar 110, and the coupling bolt 120 are not aligned with each other, vibration may not be effectively transmitted. Furthermore, when the engine is driven, the vehicle frame and the air duct may interfere with each other.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a vibration insulator including a vibration insulating bush through which an air duct may be easily assembled into a vehicle frame and which comes in line contact with a flange of the air duct and the vehicle frame and minimizes an area where vibration is transmitted, thereby minimizing vibration transmitted in a vertical direction.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In an aspect of the present invention, a vibration insulator apparatus may include a vibration insulating bush positioned in a space formed by a vehicle frame where vibration occurs due to an external force including vibration caused by a driven engine and an air duct forming a path through which air introduced from the atmosphere is supplied to a combustion chamber of the engine and coupled to the vehicle frame to receive the vibration of the vehicle frame, wherein a surface of the vibration insulating bush, contacted with the vehicle frame, forms a first line contact belt, wherein a surface of the vibration insulating bush, contacted with the air duct, forms a discontinuous contact surface having one or more non-contact portions, and wherein another surface of the vibration insulating bush, contacted with the air duct, forms a second line contact belt.

The air duct may have a flange extended therefrom and positioned at the portion coupled to the vehicle frame, wherein the vibration insulating bush has a vibration distribution flange positioned in a space formed by the flange and the vehicle frame and forming the first line contact belt and the discontinuous contact surface, and a top surface contact portion extended from the vibration distribution flange and positioned on a top surface of the flange to form the second line contact belt.

The vibration insulating bush may further include an edge portion at a lower portion thereof and a groove is formed between the edge portion and the vibration distribution flange under the flange of the air duct.

The one or more non-contact portions of the discontinuous contact surface are depressed from the discontinuous contact surface, wherein protrusions are formed at positions corresponding to the one or more non-contact portions so as to form a line contact belt.

The vibration insulating bush may include a body caught on the flange of the air duct through a through-hole in the flange of the air duct and forming a binding force, the top surface contact portion extended from a circumference of the body so as to come in line contact with the top surface of the flange, and a head housing groove forming an empty space inside the body and extended through the body, wherein the head housing groove is coupled to a coupling bolt which is fixed to the vehicle frame through a screw portion formed to the coupling bolt.

The coupling bolt may include a head housed in the head housing groove, a tool insertion groove formed in the head for a coupling tool to be inserted thereinto, and the screw portion integrated with the head and screwed to a through hole formed in the vehicle frame.

In another aspect of the present invention, a vibration insulator apparatus may include a vibration insulating bush positioned in a space formed by a vehicle frame where vibration occurs due to an external force including vibration caused by a driven engine and an air duct forming a path through which air introduced from the atmosphere is supplied to a combustion chamber of the engine, wherein a surface of the vibration insulating bush, contacted with the vehicle frame, forms a line contact belt, wherein a surface of the vibration insulating bush, contacted with the air duct, forms a discontinuous contact surface having one or more non-contact portions, and wherein another surface of the vibration insulating bush, contacted with the air duct, forms another line contact belt, and a coupling bolt including a head housed in a head housing groove formed in the vibration insulating bush, a tool insertion groove formed in the head for a coupling tool to be inserted thereinto, and a screw portion integrated with the head and screwed to a through hole formed in the vehicle frame.

The vibration insulating bush may include a vibration distribution flange positioned in a space formed by the air duct and the vehicle frame and forming the line contact belt and the discontinuous contact surface, a body integrated with the vibration distribution flange and caught on a flange of the air duct through the air duct so as to form a binding force, a top surface contact portion extended from a circumference of the body to a top surface of the flange and forming the another line contact belt with the top surface of the flange, and a head housing groove forming an empty space inside the body.

The body may further include an edge portion at a lower portion thereof and a groove is formed between the edge portion and the vibration distribution flange under the flange of the air duct.

The one or more non-contact portions formed in the vibration distribution flange are depressed from the discontinuous contact surface, wherein protrusions are formed at positions corresponding to the one or more non-contact portions so as to form the line contact belt.

In further another aspect of the present invention, a vibration insulator apparatus may include a vibration insulating bush having a body having a head housing groove therethrough, a top surface contact portion extending from the body, a vibration distribution flange formed under the body and spaced from the top surface portion, and a vehicle frame contact portion formed under the vibration distribution flange and configured to contact with the vehicle frame, and a coupling bolt coupled to the vehicle frame and including a head housed in the head housing groove of the vibration insulating bush, wherein a flange of an air duct is disposed between the top surface contact portion and the vibration distribution flange.

The body may further include an edge portion at a lower portion thereof and a groove is formed between the edge portion and the vibration distribution flange under the flange of the air duct.

The edge portion contacts with the flange of the air duct.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
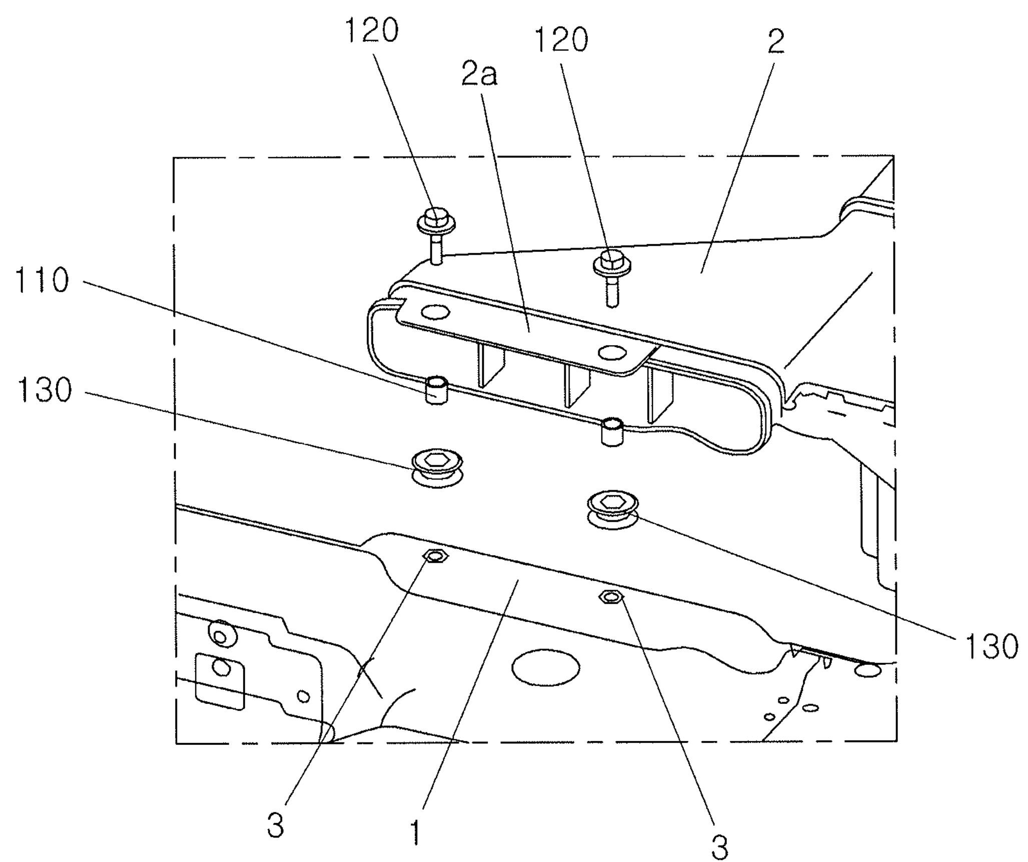
FIG. 1 is an exploded perspective view illustrating a state in which an air duct is coupled to a vehicle frame through a conventional vibration insulator.
Figure 2:
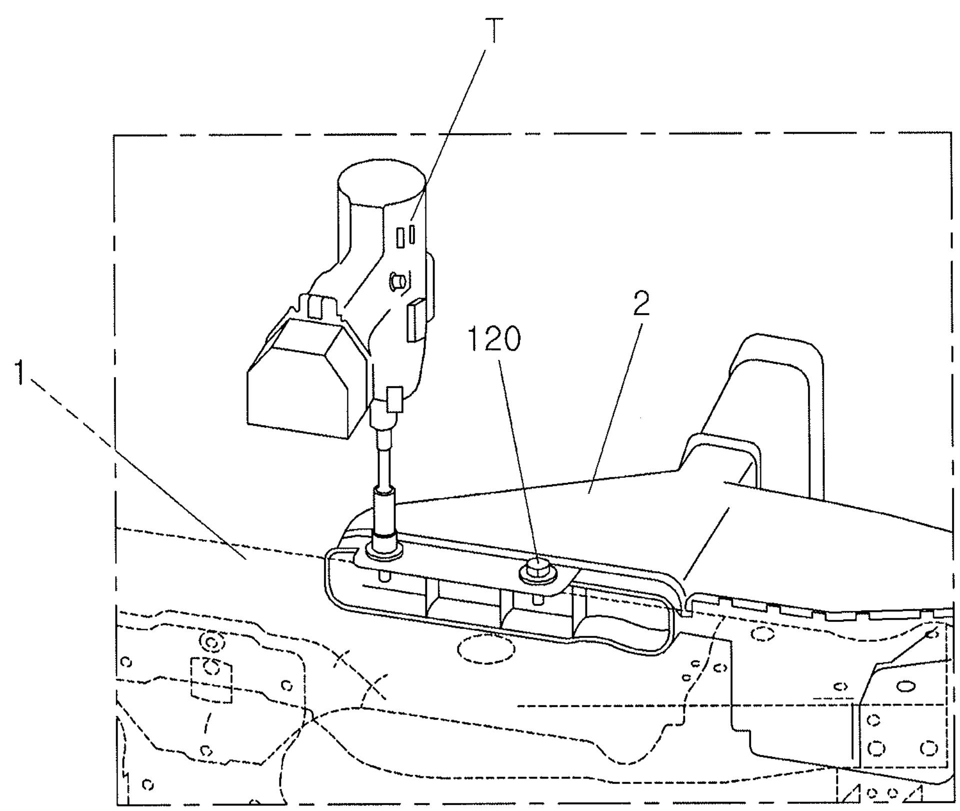
FIG. 2 is a perspective view illustrating a state in which a coupling bolt is coupled to the vehicle frame using a tool.
Figure 3:
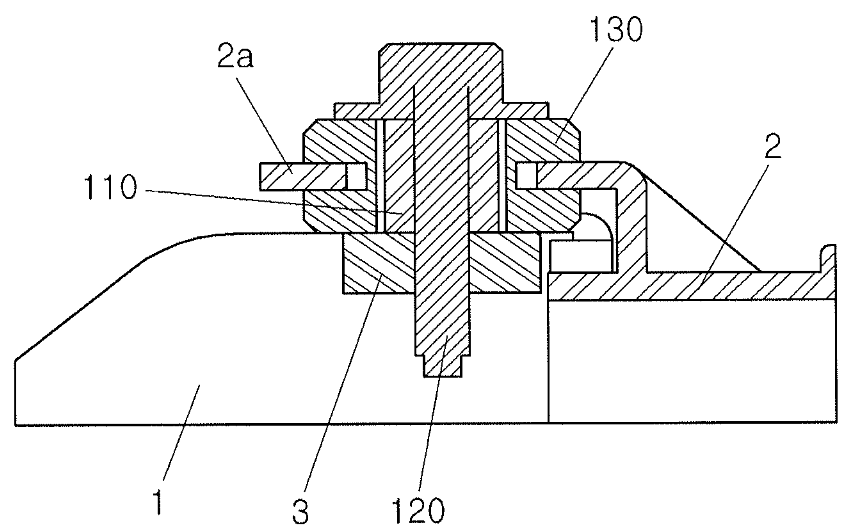
FIG. 3 is a cross-sectional view of the conventional vibration insulator.
Figure 4:
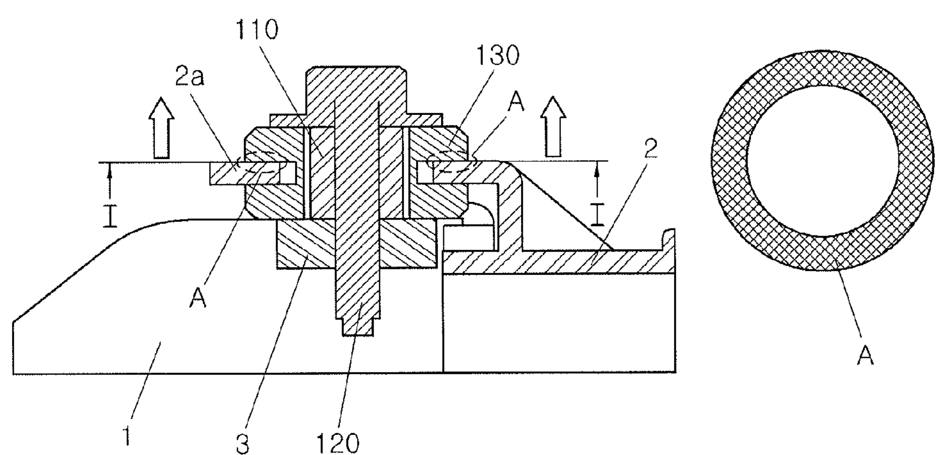
FIG. 4 is a cross-sectional view of the conventional vibration insulator when vibration is transmitted upward.
Figure 5:
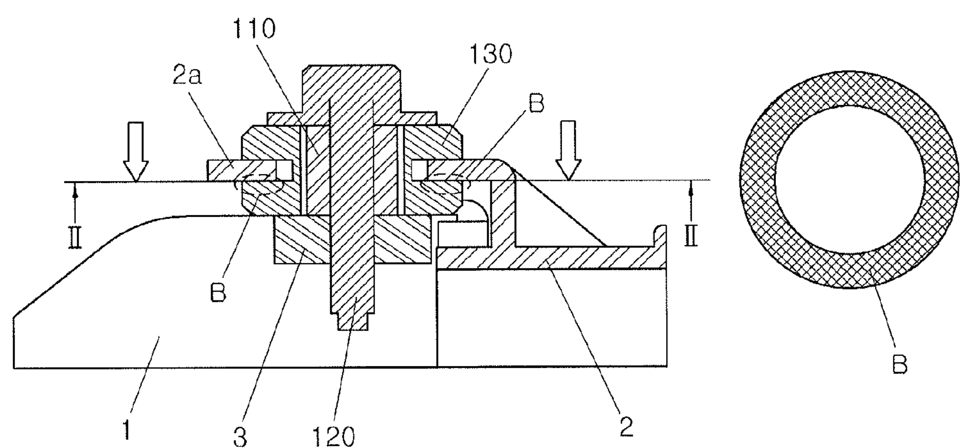
FIG. 5 is a cross-sectional view of the conventional vibration insulator when vibration is transmitted downward.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereafter, a vibration insulator in accordance with an exemplary embodiment of the present invention will be described in detail with reference to the accompanying drawings.

Figure 6:
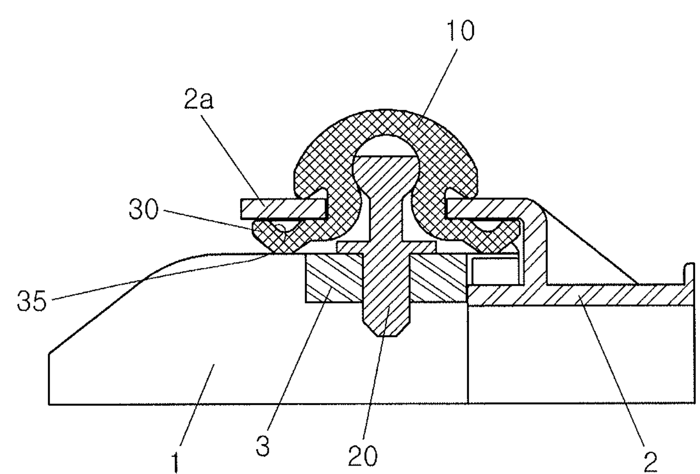
FIG. 6 is a cross-sectional view of a vibration insulator in accordance with an exemplary embodiment of the present invention.

Referring to FIG. 6, the vibration insulator in accordance with the exemplary embodiment of the present invention includes a vibration insulating bush 10 which is positioned in a space formed by a vehicle frame 1 where vibration occurs due to an external force including vibration caused by a driven engine and an air duct 2 forming a path through which air introduced from the atmosphere is supplied to a combustion chamber of the engine and coupled to the vehicle frame 1 to receive the vibration of the vehicle frame 1. A surface of the vibration insulating bush 10, contacted with the vehicle frame 1, forms a line contact belt. Furthermore, a surface of the vibration insulating bush 10, contacted with the air duct 2, forms a discontinuous contact surface having one or more non-contact portions, and another surface of the vibration insulating bush 10, contacted with the air duct 2, forms another line contact belt.

The vehicle frame 1 corresponds to a structure forming the front portion of the vehicle, and examples of the vehicle frame 1 may include a front end module (FEM) in which a radiator and the like are installed.

The air duct 2 serves as a path through which air is introduced to the combustion chamber of the engine, and an end of the air duct 2 is coupled to the vehicle frame 1. In order to couple the end of the air duct 2 to the vehicle frame 1, a flange 2*a* is extended from the air duct 2 so as to be positioned at a portion coupled to the vehicle frame 1. As the flange 2*a* is coupled to the vehicle frame 1, the air duct 2 is coupled to the vehicle frame 1.

The vibration insulating bush 10 is positioned in a space between the vehicle frame 1 and the flange 2*a* of the air duct 2. The contact area between the vibration insulating bush 10 and the vehicle frame 1 may be minimized so that the contact portion forms a line contact belt, and the surface of the vibration insulating bush 10, contacted with the flange 2*a* of the air duct 2, forms a discontinuous contact surface having one or more non-contact portions. Furthermore, another surface of the vibration insulating bush 10, contacted with the air duct 2, also forms another line contact belt.

After the vibration insulating bush 10 is fastened to the flange 2*a* of the air duct 2, the assembly is coupled to a coupling bolt 20 which is previously coupled to the vehicle frame 1. Then, the air duct 2 is completely coupled to the vehicle frame 1.

Figure 7:
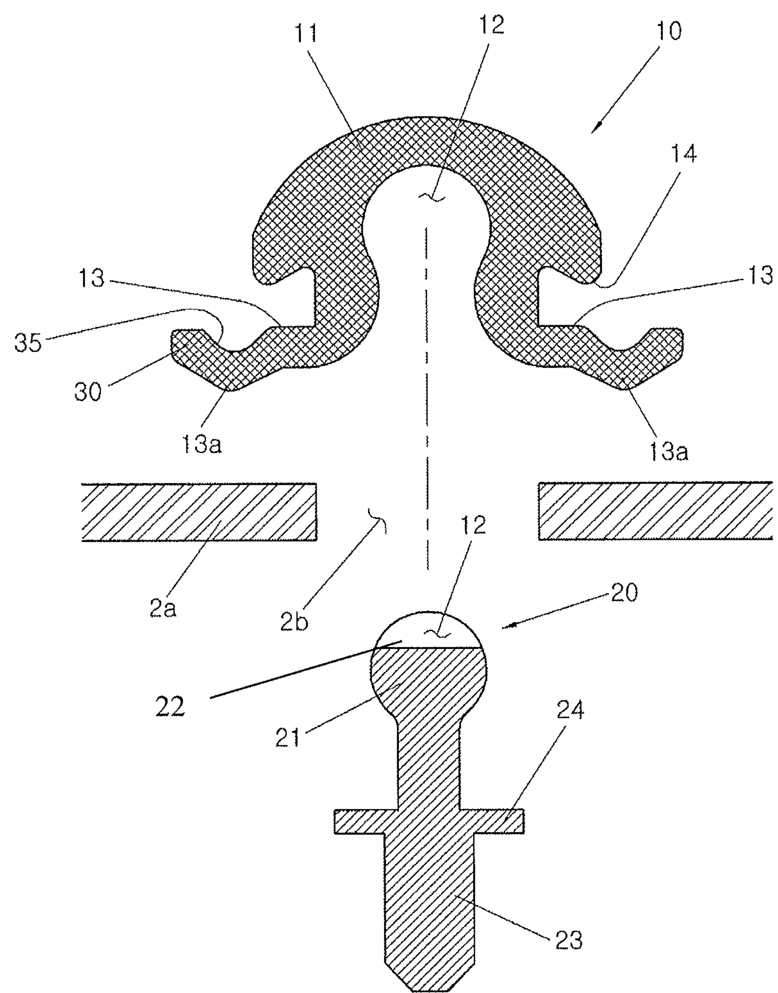
FIG. 7 is an exploded cross-sectional view of the vibration insulator in accordance with the exemplary embodiment of the present invention.

Referring to FIG. 7, the vibration insulating bush and the coupling bolt of the vibration insulator will be described in detail as follows.

The vibration insulating bush 10 includes a vibration distribution flange 13, a body 11, and a top surface contact portion 14. The vibration distribution flange 13 is positioned in a space formed by the vehicle frame 1 and the flange 2*a* of the air duct 2, and forms a discontinuous contact surface. The body 11 is extended from the vibration distribution flange 13 and caught on the flange 2*a*. The top surface contact portion 14 is extended from the circumference of the body 11 and forms another line contact belt with the flange 2*a* of the air duct 2.

The vibration distribution flange 13 is positioned in a space between the flange 2*a* and the vehicle frame 1, or desirably, positioned between the bottom surface of the flange 2*a* and the top surface of the vehicle frame 1. The vibration distribution flange 13 forms a discontinuous contact surface having one or more non-contact portions. The non-contact portions are depressed from the discontinuous contact surface, and protrusions are formed at positions corresponding to the non-contact portions and form a line contact belt (refer to C of FIG. 10). That is, one side of the vibration distribution flange 13 is contacted with the bottom surface of the flange 2*a*, and the protrusions formed in the other side of the vibration distribution flange 13 are contacted with the top surface of the vehicle 1.

In particular, the portion where the vibration distribution flange 13 and the vehicle frame 1 are contacted with each other, that is, a vehicle frame contact portion 13*a* forms a line contact belt.

The body 11 further includes an edge portion 30 at a lower portion thereof and a groove 35 is formed between the edge portion 30 and the vehicle frame contact portion 13*a* under the flange 2*a* of the air duct 2 to further dampen the vibration at the edge portion 30.

The body 11 is fastened by passing the vibration insulating bush 10 through the through-hole 2*b* of the flange 2*a*. The body 11 is fitted into the through-hole 2*b* of the flange 2*a* and forms a binding force to maintain a state in which the vibration insulating bush 10 is inserted into the through-hole 2*b*. The body 11 may be fastened to the flange 2*a* by the vibration distribution flange 13 extended from the body 11 and supporting the bottom surface of the flange 2*a* and the top surface contact portion 14 contacted with the top surface of the flange 2*a*.

Furthermore, the body 11 includes a head housing groove 12 forming an empty space formed through the vibration distribution flange 13. The head housing groove 12 may be formed in such a shape as to house a spherical object.

Figure 11:
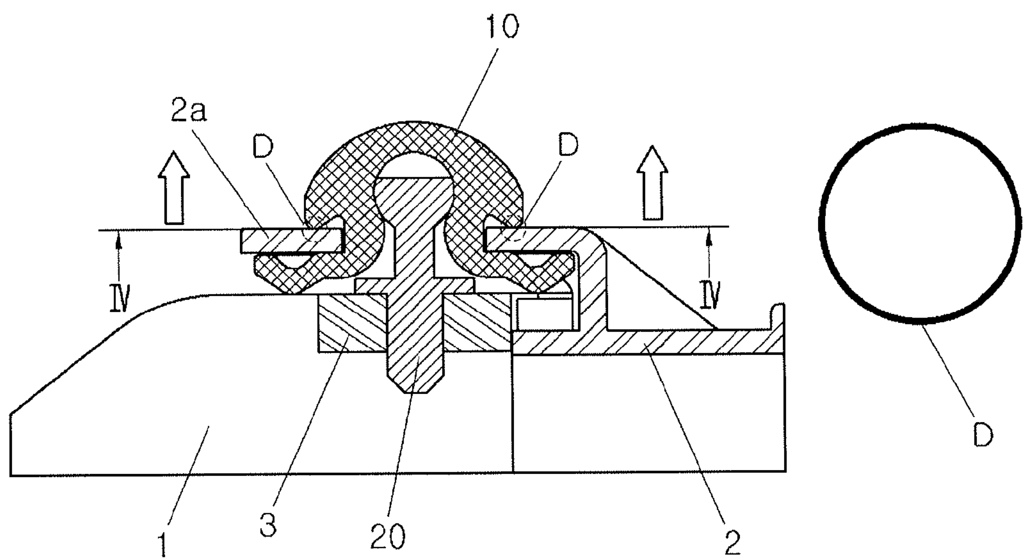
FIG. 11 is a cross-sectional view illustrating a state in which vibration is transmitted upward through the vibration insulator in accordance with the exemplary embodiment of the present invention.

The top surface contact portion 14 is extended along the circumference of the body 11, and contacted with the top surface of the flange 2*a* so as to form another line contact belt (refer to D of FIG. 11). More specifically, the top surface contact portion 14 is extended to protrude toward the top surface of the flange 2*a* from the circumference of the body 11, and the protruding end thereof is contacted with the top surface of the flange 2*a*, thereby forming the line contact belt.

The flange 2*a* is positioned between the vibration distribution flange 13 and the top surface contact portion 14, and the vibration distribution flange 13 and the top surface contact portion 14 are integrated with the body 11.

The vibration insulating bush 10 is formed of an elastic material favorable to vibration insulation, for example, synthetic rubber.

The coupling bolt 20 includes a head 21 housed in the head housing groove 12 of the vibration insulating bush 10 and a screw portion 23 screwed to the coupling nut 3 which is previously installed in the vehicle frame 1.

The head 21 is formed at the top of the coupling bolt 20. The head 21 may be formed in a shape corresponding to the head housing groove 12, that is, a spherical shape. Accordingly, the head 21 is easily inserted into the head housing groove 12, and maintains a state where it is inserted into the head housing groove 12.

Furthermore, the head 21 has a tool insertion groove 22 formed therein such that a tool such as a driver may be inserted into the tool insertion groove 22 when the coupling bolt 20 is coupled to the coupling nut 3.

The screw portion 23 is integrated with the head 21 and formed at the bottom of the coupling bolt 20. The screw portion 23 has a screw thread formed on the outer circumference thereof so as to be screwed to the coupling nut 3 which is previously installed in the vehicle frame 1.

The operation of the vibration insulator having the above-described structure in accordance with the exemplary embodiment of the present invention will be described as follows.

First, referring to FIGS. 8 and 9, the process in which the end of the air duct 2 is coupled to the vehicle frame 1 through the vibration insulator will be described as follows.

Figure 8:
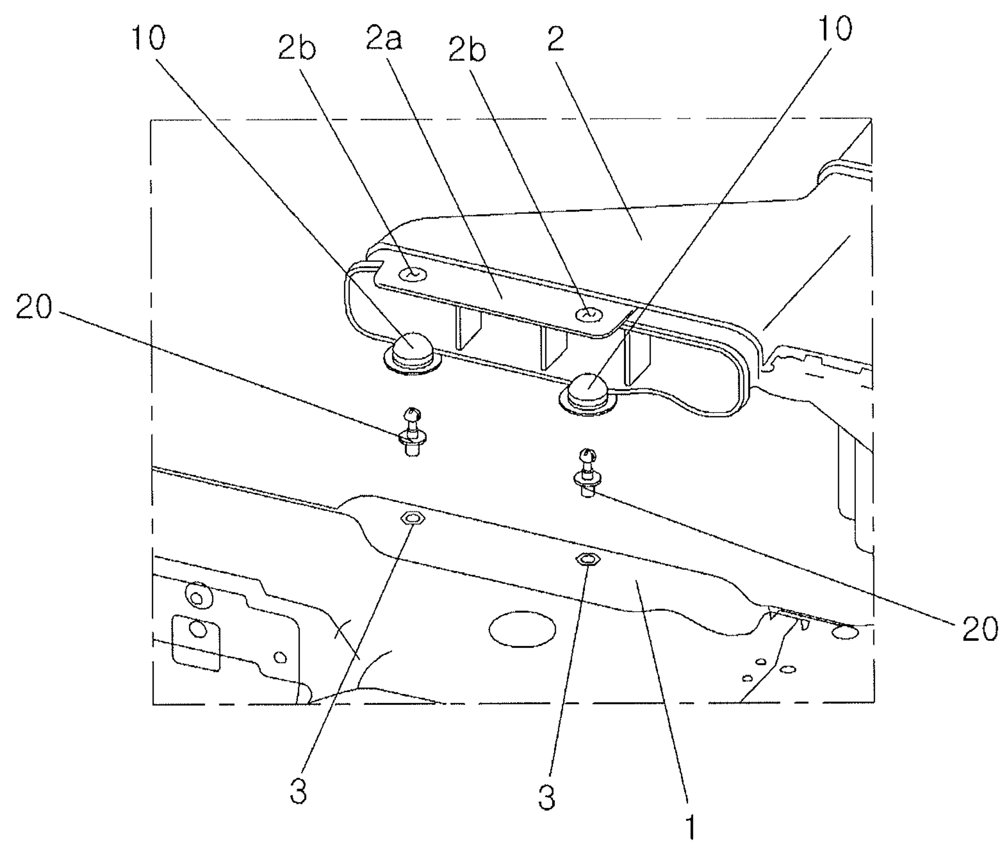
FIG. 8 is an exploded perspective view illustrating a state in which an air duct is coupled to a vehicle frame through the vibration insulator in accordance with the exemplary embodiment of the present invention.

Referring to FIG. 8, the vibration insulating bush 10 is fitted into the through-hole 2*b* formed in the flange 2*a* of the air duct 2. Since the vibration insulating bush 10 is formed of an elastic material, the vibration insulating bush 10 may be coupled to the air duct 2 only by fitting the vibration insulating bush 10 into the through-hole 2*b* of the air duct 2, without a separate tool.

Meanwhile, the coupling bolt 20 is coupled to the coupling nut 3 which is previously installed in the vehicle frame 1.

As the assembly of the air duct 2 and the vibration insulating bush 10 is fastened to the top of the coupling bolt 20 coupled to the vehicle frame 1 in a state where the vibration insulating bush 10 is fitted into the through-hole 2*b* of the air duct 2, the air duct 2 may be coupled to the vehicle frame 1.

As the vibration insulating bush 10 and the coupling bolt 20 are coupled to each other such that the head 21 of the coupling bolt 20 is housed in the head housing groove 12 of the vibration insulating bush 10, the air duct 2 may be fixed and coupled to the vehicle frame 1.

Figure 9:
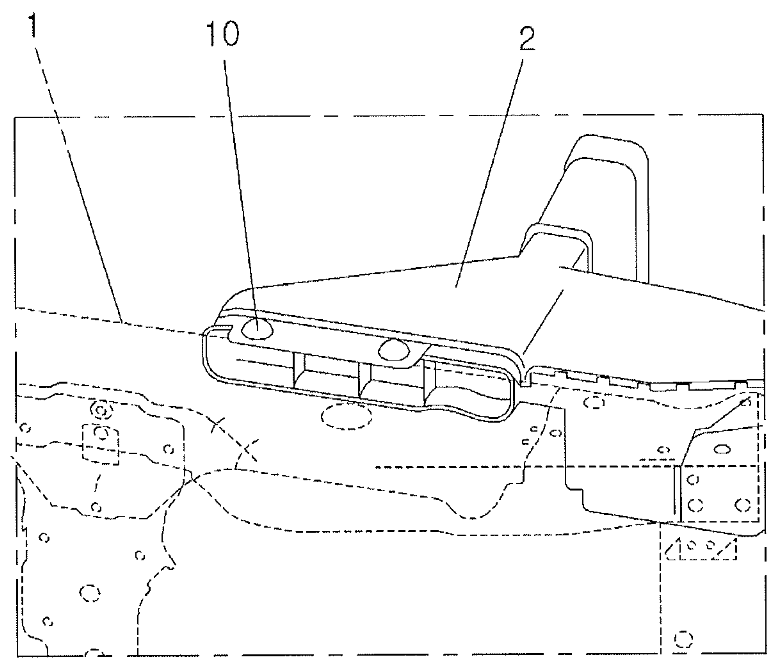
FIG. 9 is a perspective view illustrating a state in which the air duct is completely coupled to the vehicle frame through the vibration insulator in accordance with the exemplary embodiment of the present invention.

FIG. 9 illustrates a state in which the end of the air duct 2 is coupled to the vehicle frame 1 through the vibration insulating bush 10.

As described above, the air duct 2 may be coupled to the vehicle frame 1 only by pressing the vibration insulating bush 10 by hand to assemble the vibration insulating bush 10 and the coupling bolt 20 in a state where the head housing groove 12 of the vibration insulating bush 10 faces the head 21 of the coupling bolt 20, without a separate tool. Furthermore, since the centers of the vibration insulating bush 10 and the coupling bolt 20 are aligned with each other, the air duct 2 and the vehicle frame 1 do not interfere with each other.

Figure 10:
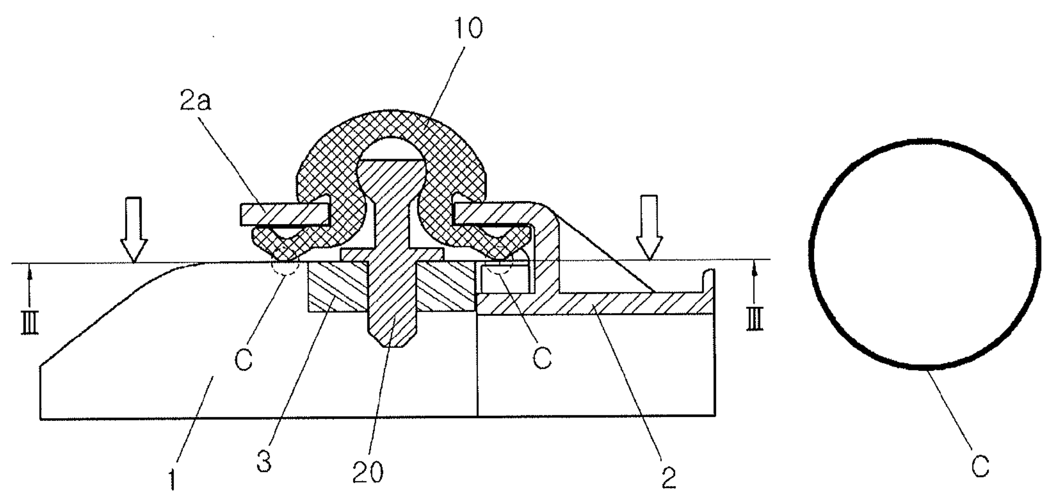
FIG. 10 is a cross-sectional view illustrating a state in which vibration is transmitted downward through the vibration insulator in accordance with the exemplary embodiment of the present invention.

FIGS. 10 and 11 illustrate a state in which vibration is transmitted in a vertical direction of the vehicle through the vibration insulator in accordance with the exemplary embodiment of the present invention.

FIG. 10 illustrates a state in which vibration is transmitted from the top to the bottom of the vehicle through the portion where the vehicle frame 1 and the air duct 2 are coupled to each other.

In this case, the vibration is applied in a direction where the flange 2*a* of the air duct 2 pressurizes the vibration distribution flange 13.

At this time, the vibration insulating bush 10 and the vehicle frame 1 are contacted with each other through the vehicle contact portion 13*a*, that is, are contacted with each other in a line contact belt shape as indicated by 'C'.

Therefore, since the vibration insulating bush 10 and the vehicle frame 1 are contacted with each other in a line contact belt shape, the width of the contact area therebetween becomes narrow, compared to the conventional vibration insulator having a belt shape with a predetermined width. Therefore, the area where vibration is transmitted is significantly reduced.

With the reduction of the area where vibration is transmitted in the vertical direction of the vehicle, a reaction force acting between the vibration insulating bush 10 and the vehicle 1 decreases.

As the reaction force decreases, the vibration insulating bush 10 does not become solid, but may maintain the initial elasticity. Accordingly, it is possible to maintain the vibration insulating characteristic in which the transmitted vibration is blocked by the vibration insulating bush 10.

FIG. 11 illustrates a state in which vibration is transmitted in the opposite direction of FIG. 10, that is, transmitted from the bottom to the top of the vehicle.

In this case, the vibration transmitted from the bottom to the top of the vehicle is transmitted through the contact portion between the top surface contact portion 14 and the flange 2*a*, that is, another line contact belt. Therefore, as described above with reference to FIG. 10 illustrating a state in which the vibration is transmitted from the bottom to the top of the vehicle, the area where the vibration is transmitted is reduced, and thus a reaction force decreases. Therefore, since the vibration insulating bush 10 maintains the initial elasticity, it is possible to insulate the vibration transmitted from the bottom to the top of the vehicle.

In accordance with the exemplary embodiment of the present invention, since the vibration insulating bush comes in line contact with the flange of the air duct and the vehicle frame, the contact area between the vibration insulating bush and the flange decreases. Thus, when vibration is transmitted in the vertical direction of the vehicle, the vibration insulating characteristic may be improved.

Furthermore, the vibration insulating bush may be coupled to the air duct without a separate tool, in a state where only the coupling bolt is coupled to the vehicle frame at the initial stage, and the end of the air duct may be coupled to the vehicle frame only by pressing the vibration insulating bush by hand to house the head of the coupling bolt in a state where the vibration insulating bush and the air duct are coupled to each other. Therefore, since the coupling is performed without a separate tool, the assembling operation may be easily performed.

Furthermore, since the collar interposed between the bush and the coupling bolt in the conventional vibration insulator is not needed, the number of parts required may be reduced.

Meanwhile, although the assembling operation is performed within a range of the allowed maximum tolerance, the vibration insulating bush is positioned in the center of the coupling bolt without leaning to one side. Therefore, it is possible to prevent interference between the vehicle frame and the air duct.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vibration insulator apparatus comprising:

a vibration insulating bush positioned in a space formed by a vehicle frame where vibration occurs due to an external force including vibration caused by a driven engine and an air duct forming a path through which air introduced from the atmosphere is supplied to a combustion chamber of the engine and coupled to the vehicle frame to receive the vibration of the vehicle frame;

wherein a surface of the vibration insulating bush, contacted with the vehicle frame, forms a first line contact belt;

wherein a surface of the vibration insulating bush, contacted with the air duct, forms a discontinuous contact surface having one or more non-contact portions;

wherein another surface of the vibration insulating bush, contacted with the air duct, forms a second line contact belt;

wherein the air duct has a flange extended therefrom and positioned at the portion coupled to the vehicle frame;

wherein the vibration insulating bush includes:

a vibration distribution flange positioned in a space formed by the flange and the vehicle frame and forming the first line contact belt and the discontinuous contact surface;

a top surface contact portion extended from the vibration distribution flange and positioned on a top surface of the flange to form the second line contact belt; and an edge portion at a lower portion thereof and a groove is formed between the edge portion and the vibration distribution flange under the flange of the air duct;

wherein the one or more non-contact portions of the discontinuous contact surface are depressed from the discontinuous contact surface, and wherein protrusions are formed at positions corresponding to the one or more non-contact portions so as to form the first line contact belt.

2. The vibration insulator apparatus of claim 1, wherein the vibration insulating bush includes:

a body caught on the flange of the air duct through a through-hole in the flange of the air duct and forming a binding force;

the top surface contact portion extended from a circumference of the body so as to come in line contact with the top surface of the flange; and a head housing groove forming an empty space inside the body and extended through the body, wherein the head housing groove is coupled to a coupling bolt which is fixed to the vehicle frame through a screw portion formed to the coupling bolt.

3. The vibration insulator apparatus of claim 2, wherein the coupling bolt includes:

a head housed in the head housing groove;

a tool insertion groove formed in the head for a coupling tool to be inserted thereinto; and the screw portion integrated with the head and screwed to a through hole formed in the vehicle frame.

4. A vibration insulator apparatus comprising:

a vibration insulating bush positioned in a space formed by a vehicle frame where vibration occurs due to an external force including vibration caused by a driven engine and an air duct forming a path through which air introduced from the atmosphere is supplied to a combustion chamber of the engine, wherein a surface of the vibration insulating bush, contacted with the vehicle frame, forms a line contact belt, wherein a surface of the vibration insulating bush, contacted with the air duct, forms a discontinuous contact surface having one or more non-contact portions, and wherein another surface of the vibration insulating bush, contacted with the air duct, forms another line contact belt; and a coupling bolt including:

a head housed in a head housing groove formed in the vibration insulating bush, a tool insertion groove formed in the head for a coupling tool to be inserted thereinto; and a screw portion integrated with the head and screwed to a through hole formed in the vehicle frame.

5. The vibration insulator apparatus of claim 4, wherein the vibration insulating bush includes:

a vibration distribution flange positioned in a space formed by the air duct and the vehicle frame and forming the line contact belt and the discontinuous contact surface;

a body integrated with the vibration distribution flange and caught on a flange of the air duct through the air duct so as to form a binding force;

a top surface contact portion extended from a circumference of the body to a top surface of the flange and forming the another line contact belt with the top surface of the flange; and a head housing groove forming an empty space inside the body.

6. The vibration insulator apparatus of claim 5, wherein the body further includes an edge portion at a lower portion thereof and a groove is formed between the edge portion and the vibration distribution flange under the flange of the air duct.

7. The vibration insulator apparatus of claim 5, wherein the one or more non-contact portions formed in the vibration distribution flange are depressed from the discontinuous contact surface, and wherein protrusions are formed at positions corresponding to the one or more non-contact portions so as to form the line contact belt.

* * * * *